United States Patent
Hunt

[11] Patent Number: 5,971,683
[45] Date of Patent: Oct. 26, 1999

[54] MULTIPURPOSE ANCHOR

[76] Inventor: Kyle C. Hunt, 5550 Astor La. #309, Rolling Meadows, Ill. 60008

[21] Appl. No.: 09/240,384

[22] Filed: Jan. 29, 1999

Related U.S. Application Data

[60] Provisional application No. 60/073,270, Jan. 30, 1998.

[51] Int. Cl.[6] .................................................. B60P 7/08
[52] U.S. Cl. ....................... 410/106; 410/101; 410/110; 410/116
[58] Field of Search .................................. 410/101, 102, 410/106, 110, 116; 24/265 CD, 115 K; 248/499

[56] References Cited

U.S. PATENT DOCUMENTS

| | | | |
|---|---|---|---|
| 2,422,693 | 6/1947 | McArthur | 410/116 |
| 2,609,761 | 9/1952 | Clark | 410/101 |
| 2,627,637 | 2/1953 | Downing | 410/101 |
| 4,295,765 | 10/1981 | Burke | 410/101 |
| 4,992,015 | 2/1991 | Florence | 410/101 X |
| 5,738,471 | 4/1998 | Zenter et al. | 410/110 |

*Primary Examiner*—Stephen T. Gordon
*Attorney, Agent, or Firm*—Marshall A. Burmeister

[57] ABSTRACT

A multipurpose anchor assembly includes a block assembly for mounting to the upper sidewall of a cargo carrying vehicle to accommodate tie down of handled cargo. A pin is received through an aperture in the block and engages a spring mounted plate assembly which allows for engagement of the pin for locking in selective positions. The pin includes an eye formation at a top thereof to facilitate attachment of a tie down lashing member.

11 Claims, 2 Drawing Sheets

MULTIPURPOSE ANCHOR

This application is a continuation of Provisional Application No. 60/073,270, filed Jan. 30, 1998, by the present inventor. This invention relates to devices for securing loads to a bulkhead, such as tie-down anchors for truck beds or anchors for removably mounting objects on walls.

BACKGROUND OF THE INVENTION

For at least half of a century, inventors have recognized the need for a device to releasably attach a load to the bed of a truck or the like, and have responded with a variety of devices for this purpose. Examples of such devices are as follows.

U.S. Pat. No. 3,102,708 to Lee J. Crain entitled Retractable Rope hook granted in 1963 discloses a pop-up spring-loaded hook mounted in the top rail of a pickup truck.

U.S. Pat. No. 3,178,790 to Anthony F. Cech entitled Load Fastener granted in 1965 discloses a releasable strap anchor with two slidable spring-loaded hook plates for insertion into one of a plurality of slots in a channel member to secure the strap to the channel member.

U.S. Pat. No. 3,259,353 to Ivan F. Webb entitled Rope hook granted in 1966 discloses a device for insertion into a stake-opening or pocket in the top of the walls of a pickup truck, the device providing a removable hook for engaging a rope.

U.S. Pat. No. 3,595,125 to Charles H. Jacobs entitled Pickup Stake-Pocket Tie Ring granted in 1971 describes another device which utilizes the stake-opening of a pickup truck for mounting a hook or ring, this device having a screw positionable wedge for securing the device in the stake-pocket.

U.S. Pat. No. 4,607,991 to David R. Porter entitled Tie-Down Anchor for Truck Bed granted in 1986 describes yet another device which utilizes the stake-pocket of a pickup truck for mounting a ring or bolt, this device using spring loaded arms to retain bolt heads in openings in the walls of the stake-pocket.

U.S. Pat. No. 4,945,849 to John L. Morris and Robert L. Martin entitled Retractable Cleat granted in 1990 describes a spring loaded pop-up hook or cleat adapted to be mounted on a flat surface, such as the deck of a boat, with a manually actuatable mechanism for retaining the cleat in depressed position.

The devices of the prior art are generally designed to function in a particular environment, such as the stake-pocket of a pickup truck or a boat deck, as in the foregoing examples. Further, most prior art devices are designed for use with particular loads, such as a rope, belt, or the like. Also many of the prior art devices are limited by their design to light load service,

SUMMARY OF INVENTION

It is an object of the present invention to provide a device for anchoring a load or object which overcomes the disadvantages of devices of the prior art. In particular, it is an object of the present invention to provide an anchoring device that is more versatile than prior art devices and is capable of different uses.

It is also an object of the present invention to provide an anchoring device that is more readily released from its load than most prior art devices, that is readily rendered unobtrusive by removal of the protruding load carrying pin and ring, is significantly easier to use than prior art devices, and is more versatile in use than prior art devices.

The objects of the present invention are provided by a novel anchor that is mountable on the side rail of the bed of a pickup truck, or other surface such as a wall, either vertically or horizontally. The anchor comprises a solid block, which is preferably constructed of metal or plastic, and the block has a first surface adapted to be disposed upon and secured to the surface upon which the anchor is to be used. The block also has a second surface generally opposed to the first surface and a third surface extending between the first and second surfaces. An elongated channel extends into the block from and generally normal to the first surface and preferably extends through the block. The channel has a uniform cross section, and is preferably cylindrical. The block also has a recess extending therein from the third surface, and the recess has an axis generally parallel to the first surface. The recess traverses the channel, and a plate is movably disposed within the recess and extends outwardly from the third surface. The plate extends through the channel and has an aperture at least equal in size to the cross section of the channel, the aperture being coaxial with the channel in one position of the plate. In a preferred construction, the aperture has two portions, one portion slightly larger and generally conforming to the shape of the cross section of the channel, and a second portion of smaller cross section shaped to engage a removable pin.

The pin is removably and slidably disposed within the channel of the block and extends through the aperture of the plate, and the pin is provided with at least one and preferably a plurality of spaced indentations disposed along the axis of the pin that are adapted to accommodate the confronting second portion of the plate when the plate is aligned with one of the indentations of the pin. In a preferred construction, the pin is cylindrical, and the indentations are in the form of cylindrical grooves that extend coaxially about the pin and are spaced along the longitudinal axis of the pin. In this construction, the second portion of the aperture is part cylindrical with a diameter less than the diameter of the pin but greater than the diameter of the cylindrical surface of the indentations in the pin.

The plate is movable in the recess to permit alignment of the aperture with the indentations in the pin, and that movement may be mechanically limited to linear, rotary or pivotal motion. In a preferred embodiment, the recess is linear and the plate is translatable along the axis of the recess. In this embodiment, the plate is spring biased and urged out of the position of coaxial alignment of the aperture and channel.

DESCRIPTION OF THE DRAWINGS

These and other objects and advantages of the present invention will become apparent from the following description and the attached drawings, in which.

DETAILED DESCRIPTION OF THE INVENTION

Figure 1:
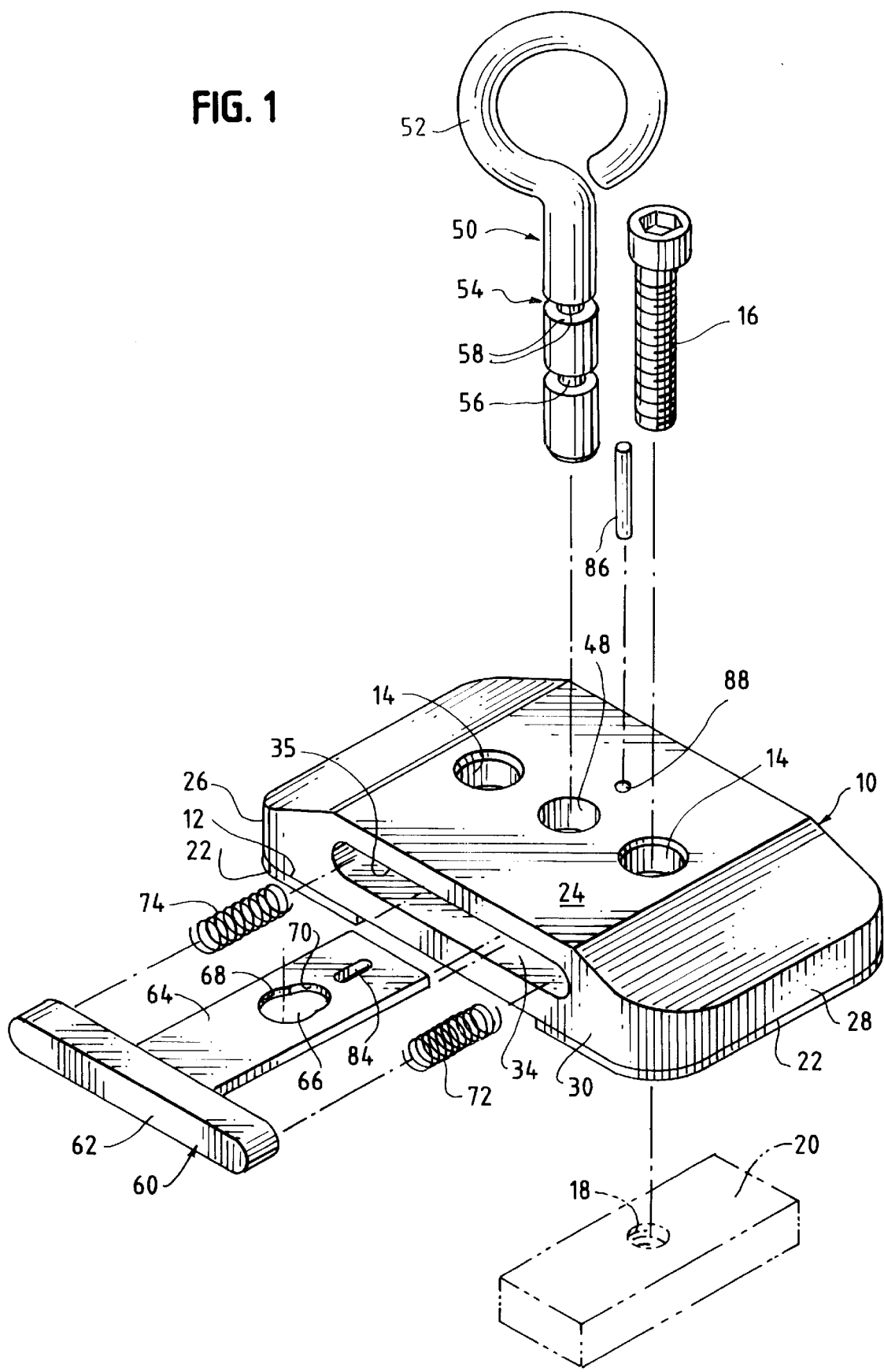
FIG. 1 is an exploded view of an anchor constructed in the manner of the present invention.
Figure 2:
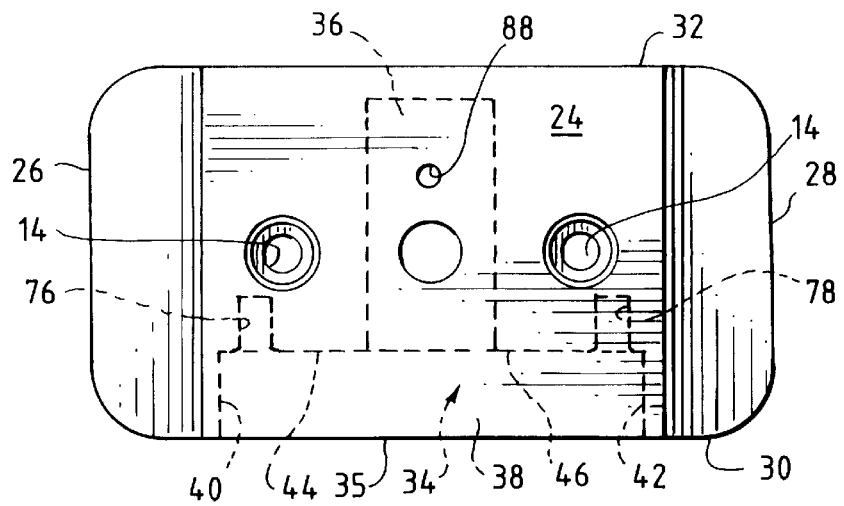
FIG. 2 is a top elevational view of the block of the anchor of FIG. 1, the block being illustrated alone for clarity.

As illustrated in the Figures, the anchor of the present invention has a block 10 with a first surface 12 that is adapted to be mounted in a permanent manner abutting a bulkhead surface, such as the horizontal surface at the top of a side rail of the bed of a pickup truck (not shown). Since the horizontal surface at the top of a side rail of a pickup truck are generally flat, the surface 12 is illustrated as flat, but if the bulkhead upon which it is intended for use is other than flat, a shape that conforms to that surface is preferable. The block 10 has two holes 14 for receiving bolts 16 which are intended to pass through the block 10 and the bulkhead for engaging threaded apertures 18 that extend through securing bars 20 on the opposite side of the bulkhead to secure the anchor to the bulkhead surface. A pair of thin flat rectangular strips 22 are provided for positioning between the surface 12 of the block and the bulkhead, the strips being disposed adjacent to opposite sides 26 and 28 of the block 10. Each strip 22 is provided with a hole (not shown) aligned with one of the holes 14 of the block 10 to accommodate a bolt 16. The anchor includes two bolts 16 and two bars 20, but only one of these items is illustrated in FIG. 1 for clarity.

The block 10 also has a second surface 24 that is flat and parallel to the first surface 12, and side surfaces 26 and 28 extending between the surfaces 12 and 24 at the opposite sides of the block, the edges between the surface 24 and sides 26 and 28 being chamfered for aesthetic purposes. In addition, the block 10 has end surfaces 30 and 32 that are mirror images of each other and extend between the surfaces 12 and 24, and side surfaces 26 and 28.

The block 10 has a recess 34 extending therein from a mouth 35 on the surface 30. The recess 34 has an elongated rectangular first portion 36 with the axis of elongation disposed on the central axis of the block 10. In cross section, the recess 34 has major axes parallel to the first surface 12 of the block 10 and minor axes parallel to the side surfaces 26 and 28. In addition, the recess 34 of the block 10 has a second portion 38 extending therein from the mouth 35 on the end surface 30, the second portion 38 of the recess extending from the mouth 35 to the first portion 36. The second portion 38 of the recess has a central axis of elongation extending from opposed semi-cylindrical walls 40 and 42 parallel to the first surface 12 and the axis of elongation of the second portion 38 normally intersects the central axis of elongation of the first portion 36 of the recess. The semi-cylindrical walls 40 and 42 are equally spaced from the longitudinal axis of the first portion 36 of the recess and form shoulders 44 and 46 on the block 10 confronting the mouth of the recess 34.

The block 10 also has a linear channel 48 that extends normally from the center of the first surface 12 through the block and the second surface 24, the channel thus extending through the first portion 36 of the recess 34. The channel 48 slidably and removably accommodates a pin 50 for impressing a load on the anchor. Preferably, the channel 48 and the pin 50 are cylindrical, as illustrated, but other cross sections, such as square, could be employed; however, the pin 50 will be rotatable in the channel 48 only if the channel and pin are cylindrical. The pin 50 is provided with a ring 52 at one end and two spaced circumferential grooves 54, as illustrated in FIG. 1. Each of the grooves 54 has a cylindrical inner surface 56 coaxial with the outer surface of the pin and opposed flat radial walls 58 extending between the cylindrical inner surface 56 and the surface of the pin 50. The ring 52 is intended to receive a tie rope or bolt (not shown) to secure a load to the anchor.

In order to secure the pin 50 on the block 10, a means for releasably locking the pin on the block is disposed within the recess 34. The means for releasably locking the pin on the block includes an actuator 60 which has a push bar 62 conforming in shape with the second portion 38 of the recess 34, and the push bar is journaled within the second portion 38 of the recess 34, the push bar extending outwardly from the mouth 35 of the recess 34 in the wall 30. The releasable locking means also includes a rectangular plate 64 that is mounted on the push bar and slidably extends into the first portion 36 of the recess 34. The surfaces of the first portion 36 of the recess 34 that are parallel to the axis of elongation thereof serve to journal and guide the plate 64. The plate 64 has a thickness slightly less than the distance between the walls 58 of the pin 50, and the plate confronts the cylindrical channel 48 and has an aperture 66 disposed with its center on the central longitudinal axis of the plate, the aperture being of sufficient size to accommodate the pin 50.

The aperture 66 consists of first part 68 that is part cylindrical with a diameter at least equal to that of the pin 50 and preferably approximately equal to that of the cylindrical channel 48. The aperture 66 also includes a second part 70 that is substantially semi-cylindrical with a diameter between the diameter of the cylindrical surface 66 of the groove 54 of the pin 50 and the diameter of the pin 50. The second part 70 of the aperture 66 is also centered on the central longitudinal axis of the plate 64, but its center is displaced from the center of the first part 68 of the aperture in a direction away from the push bar 62. In one translational position of the plate 64 in the first portion 36 of the recess 34, the first part 68 of the aperture 66 is aligned with the channel 48, and in this translational position the pin 50 is translatable and rotatable in the channel 48.

Figure 3:
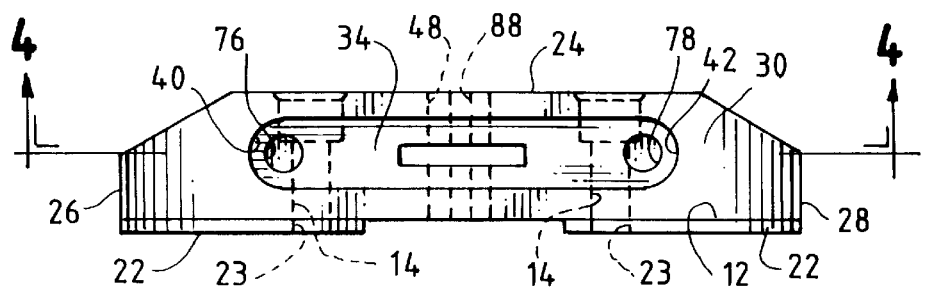
FIG. 3 is a side elevational view of the block of FIGS. 1 and 2 with mounting strips attached.
Figure 4:
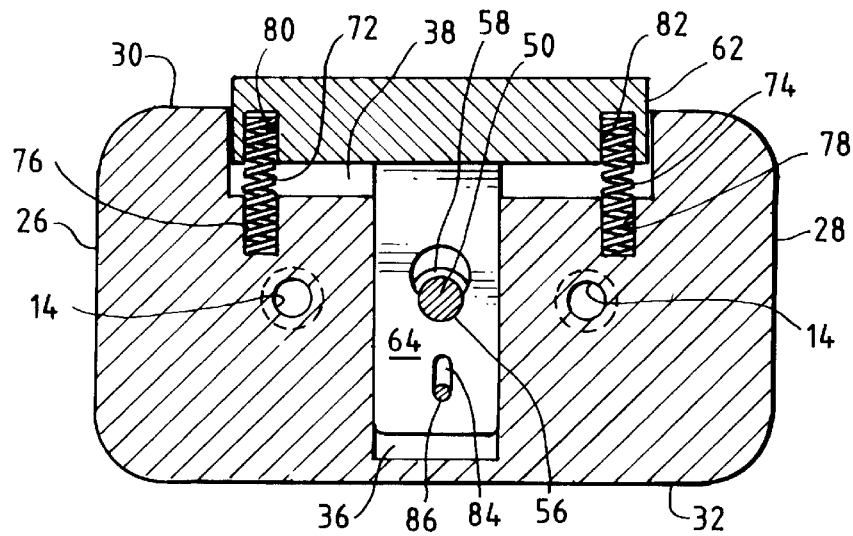
FIG. 4 is a sectional view of the assembled anchor taken along the line 4—4 of FIG. 3.

The T-shaped actuator 60 is spring biased by a pair of helical springs 72 and 74 to move outwardly of the recess 34 of the block 10. As illustrated in FIGS. 3 and 4, the block 10 has a pair of indentations 76 and 78 in the shoulders 44 and 46 formed by the second portion 38 of the recess 34, the indentation 76 being adjacent to the wall 40 of the recess 34 and the indentation 76 being adjacent to the wall 42 of the recess 34. The push bar 62 is also provided with wells 80 and 82 which are of the same depth and diameter as the indentations 76 and 78, and the wells 80 and 82 are aligned on common axes with the indentations 76 and 78, respectively. The spring 72 is mounted at one end in a first well 80 in the push bar 62 and at the other end in indentation 76 in the shoulder 44 of the block 10; and the spring 74 is mounted at one end in the second well 82 in the push bar 62 and at the other end in the indentation 78 in the shoulder 46 of the block 10. Accordingly, the actuator 60 is spring biased to translate the plate 64 thereof outwardly of the recess 34 in the block 10, thus establishing pressure between the wall of the aperture 66 in the plate 64 and the pin 50 within the channel 48.

The plate 64 has a thickness slightly less than the distance between the walls 58 of the grooves 56 of the pin 50, and the grooves, if properly positioned, will accommodate the portion of the plate adjacent to the aperture 66, and in particular the semi-cylindrical second part 70 of the aperture. When the portion of the plate 64 adjacent to the aperture 66 is disposed in one of the grooves 58, the pin 50 is rotatable in the channel 48 but not translatable therein.

The depending plate 64 of the actuator 60 is provided with a slot 84 which extends along the central major axis of the plate 64, and the slot slidably accommodates a post 86 that is mounted in a bore 88 in the block 10. The bore 88 extends between the first surface 12 and the second surface 24 of the block 10, and traverses the second portion 38 of the recess 34. The post 86 extends into the second portion 38 of the recess 34, and is trapped within the slot 84 of the translatable plate 64. The post 86 limits translational movement of the plate 64 in its travel into the recess 34 to the position of alignment of the aperture 66 of the plate 64 and the channel 48, thereby releasing the pin 50 for translational movement. With the actuator fully depressed, the pin 50 can be readily inserted through the channel 48 of the block and the aperture 66 of the actuator 60, and the plate 64 aligned with one of the grooves 54 of the pin 50. In this position, the plate 64 will seat in the confronting groove 54 with part 70 of the aperture 68 engaging the cylindrical surface 56 of the pin 50. Releasing the actuator bar 62 results in the springs 72 and 74 forcing the plate 64 to move into the groove 54 and secures the pin 50 in position on the block 10.

To remove the pin 50 from the block 10, the portion of the push bar 62 of the actuator 60 which protrudes from the surface 30 is manually depressed to release the pin 50 from the plate 64 of the actuator 60, thus making the pin 50 translatable out of the channel 48 of the block 10 and the aperture 66 of the actuator 60.

Those skilled in the art, as a result of the foregoing disclosure, will devise many constructions and many applications not specifically set forth above. For example, the inventor contemplates use of the anchor on vertical walls for removably mounting structures, such as book shelves and the like, thereby taking advantage of the versatility of the anchor here described. It is therefore intended that this invention not be limited by the specific disclosure set forth above, but rather only by the following claims.

The invention claimed is:

1. A multipurpose anchor comprising a block of solid material having a first surface adapted to be disposed upon and secured to a bulkhead, said block having a second surface opposed to the first surface and a third surface extending between the first and second surfaces, said block having a linear channel extending into the block from the second surface, said channel being disposed on a first axis and having a uniform cross section, and said block having a recess extending into the block on a second axis from a mouth disposed on the third surface, said recess traversing the channel, a pin adapted to be slidably disposed within the channel and extend through the recess, said pin having an outer surface with an indentation therein, a plate movably disposed within the recess and extending outwardly from the block through the mouth on the third surface, said plate extending through the channel and having an aperture aligned with the channel, the aperture in the plate being larger than the pin and adapted to accommodate the pin, stop means associated with the plate and manually operable by engaging the plate exterior of the block limiting movement of the plate between a first position in which the plate engages the indentation of the pin and prevents translation of the pin within the channel and a second position in which the pin is slidably disposed within the aperture of the plate.

2. A multipurpose anchor comprising the combination of claim 1 wherein spring bias means are provided between the plate and the block urging the plate into the first position.

3. A multipurpose anchor comprising the combination of claim 2 wherein the first axis of the channel and the second axis of the recess intersect normally, the plate traversing the channel and the aperture in the plate having a cross section at least equal to that of the cross section of the pin, said aperture being coaxially aligned with the channel in the second position of the plate, the indentation of the pin being a slot disposed in a plane normal to a longitudinal axis of the pin and adapted to confront the plate, said slot being adapted to engage and accommodate a confronting portion of the plate when the plate is aligned with the slot of the pin.

4. A multipurpose anchor comprising the combination of claim 3 wherein the indentation in the pin is a first groove extending around the pin having a cylindrical inner surface coaxial with the longitudinal axis of the pin and walls extending from opposite ends of the cylindrical surface normal to the axis of the pin.

5. A multipurpose anchor comprising the combination of claim 4 wherein the pin is provided with a plurality of grooves, including said first groove, each groove extending around the pin and being spaced from adjacent ones of said grooves along the longitudinal axis of the pin.

6. A multipurpose anchor comprising the combination of claim 4 wherein the aperture in the plate has a first part-cylindrical portion centered on the first axis of the channel when the plate is at the second position, said first part-cylindrical portion of the aperture having a diameter greater than the diameter of the pin, said aperture of the plate having a second part cylindrical portion centered on the second axis of the recess and displaced from the center of the first part-cylindrical portion inwardly of the recess, the diameter of the second part-cylindrical portion of the recess being between the diameter of the pin and the diameter of the cylindrical surface of the groove of the pin, the second part-cylindrical portion of the aperture being adapted to accommodate the groove of the pin.

7. A multipurpose anchor comprising the combination of claim 1 wherein the recess of the block extends into the block from the third surface along the second axis forming a quadrangular pocket with a pair of opposing side walls and a pair of opposing end walls parallel to the second axis, the plate being quadrangular in shape and having a pair of side walls and a pair of end walls slidably engaging the side walls and end walls of the pocket respectively, whereby movement of the plate is limited to translation along the second axis of the recess.

8. A multipurpose anchor comprising the combination of claim 7 wherein the plate is provided with an elongated opening disposed between and parallel to the end walls of the plate, and a post is mounted on the block and extends into the opening, the plate being translatable within the recess between one position in which the post abuts one end of the opening farthest from the mouth of the recess and a second position in which the post is disposed in abutment with a second end of the opening adjacent to the mouth of the recess.

9. A multipurpose anchor comprising the combination of claim 8 wherein the recess is provided with an expanded portion adjacent to the mouth forming a pair of outwardly extending shoulders from end surfaces of the pocket, said plate having a button translatably disposed within the expanded portion of the recess and extending from the mouth, the button being translatable within the expanded portion of the recess.

10. A multipurpose anchor comprising the combination of claim 9 wherein each of the outwardly extending shoulders of the expanded portion of the recess is provided with a bore on an axis parallel to the second axis of the recess, a confronting surface of the button have confronting and matching bores, and a pair of cylindrical coil springs anchored at opposite ends in the confronting bores of the button and shoulders.

11. A multipurpose anchor comprising a block of solid material having a first generally flat surface adapted to be disposed upon and secured to a bulkhead, said block having a second generally flat surface parallel to the first surface and a third surface extending between the first and second surfaces, said block having an elongated cylindrical channel extending through the block from and normal to the first and second surfaces, and said block having a recess extending into the block from the third surface and traversing the channel, said recess having a rectangular cross section with a major axis parallel to the first and third surfaces of the block, said recess having a longitudinal axis parallel to the first and second surfaces, a plate having an elongated portion with a rectangular cross section translatably disposed within the recess, said plate having a portion extending outwardly from the third surface, said plate intersecting the channel and having a cylindrical aperture of a diameter greater than the diameter of the channel, said aperture being coaxially aligned with the channel in one translational position of the plate, said plate having an elongated opening extending therethrough and disposed parallel to an axis of elongation of the plate, an elongated post mounted on the block and extending through the recess normal to the first and second surfaces of the block, said post being translatably disposed in the elongated opening of the plate and abutting one end of the opening when the channel and aperture are in coaxial alignment, a spring disposed between the plate and the block urging the plate from coaxial alignment of the aperture and channel, and an elongated cylindrical pin adapted to be slidably disposed within the channel and extending outwardly from the first and second surfaces of the block, said pin having a plurality of spaced slots extending about the circumference thereof, each of said slots being adapted to accommodate a confronting portion of the plate when the plate is aligned with a said slot of the pin and arrest further translation of the pin in the channel.

\* \* \* \* \*